Nov. 1, 1927. 1,647,358
C. R. HUBBARD
MACHINE FOR CUTTING ANNULAR ARTICLES
Filed May 14, 1924 6 Sheets-Sheet 1

Inventor
CECIL R. HUBBARD
By his Attorney

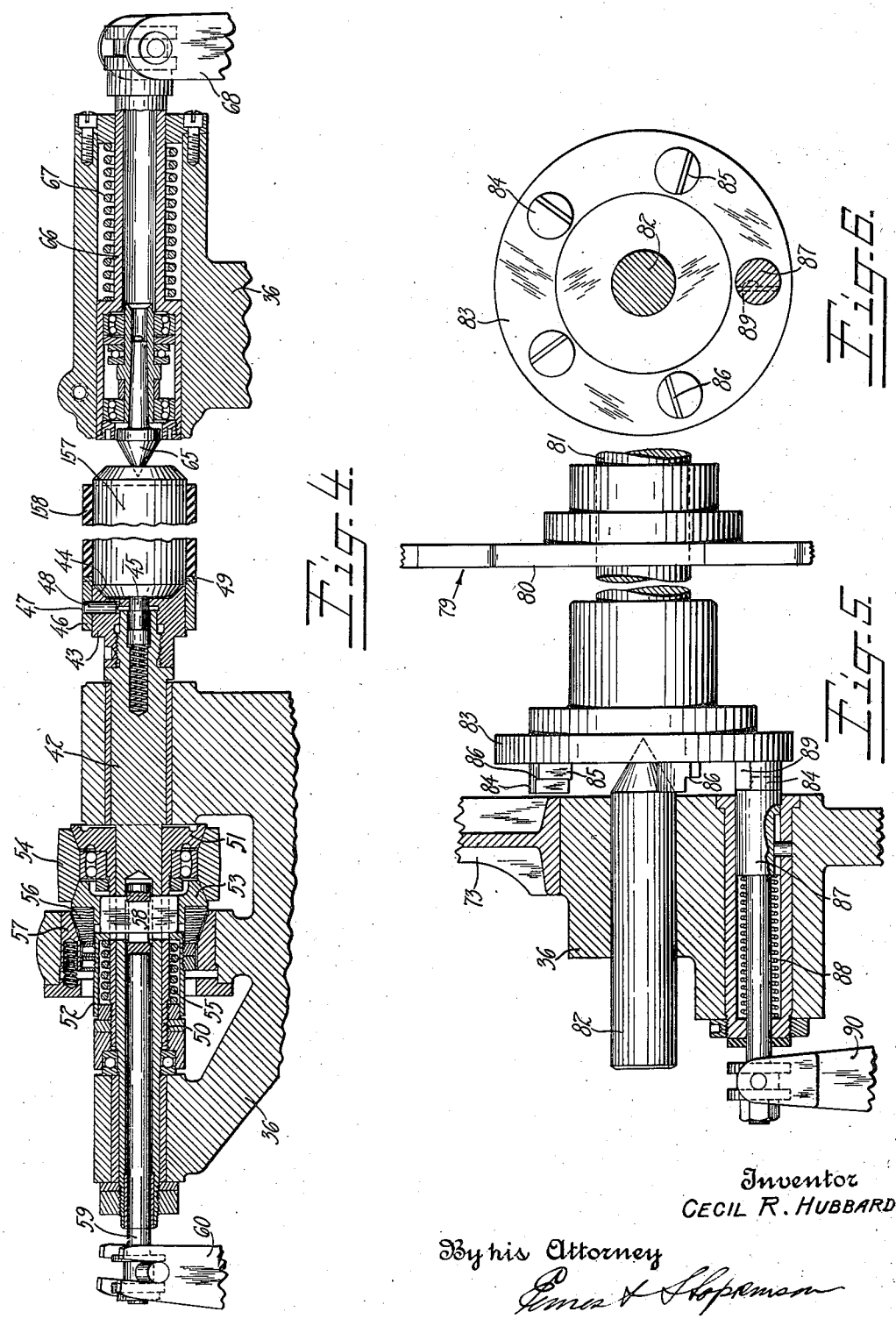

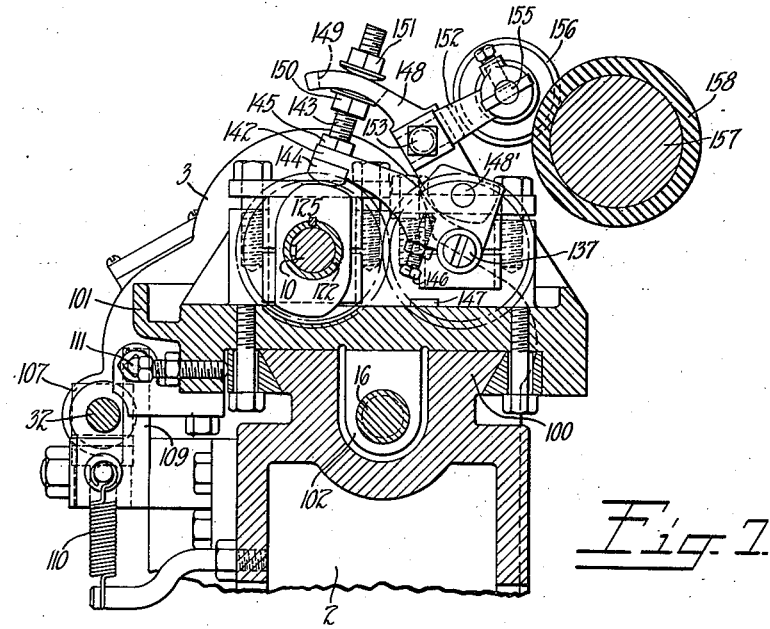

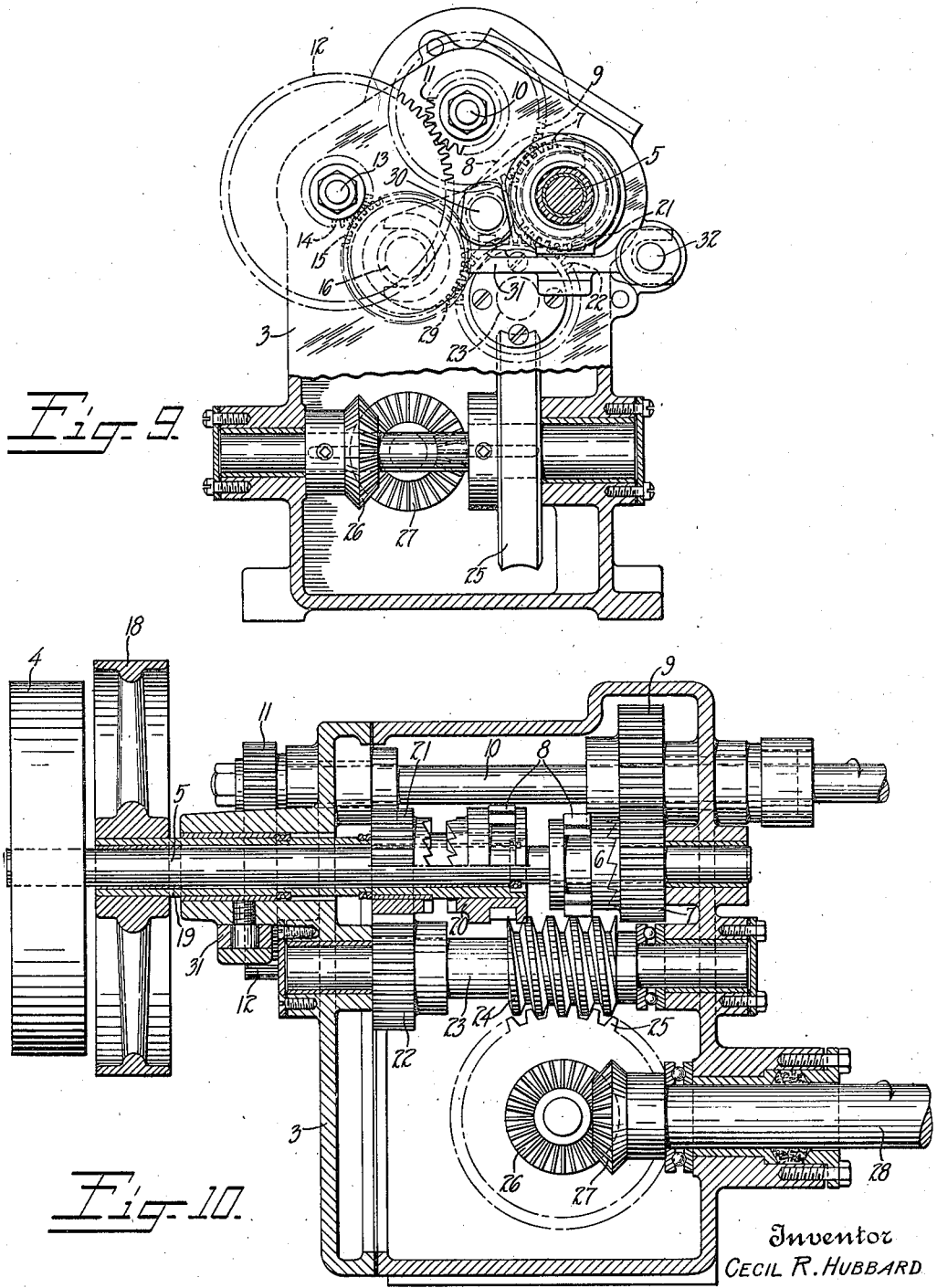

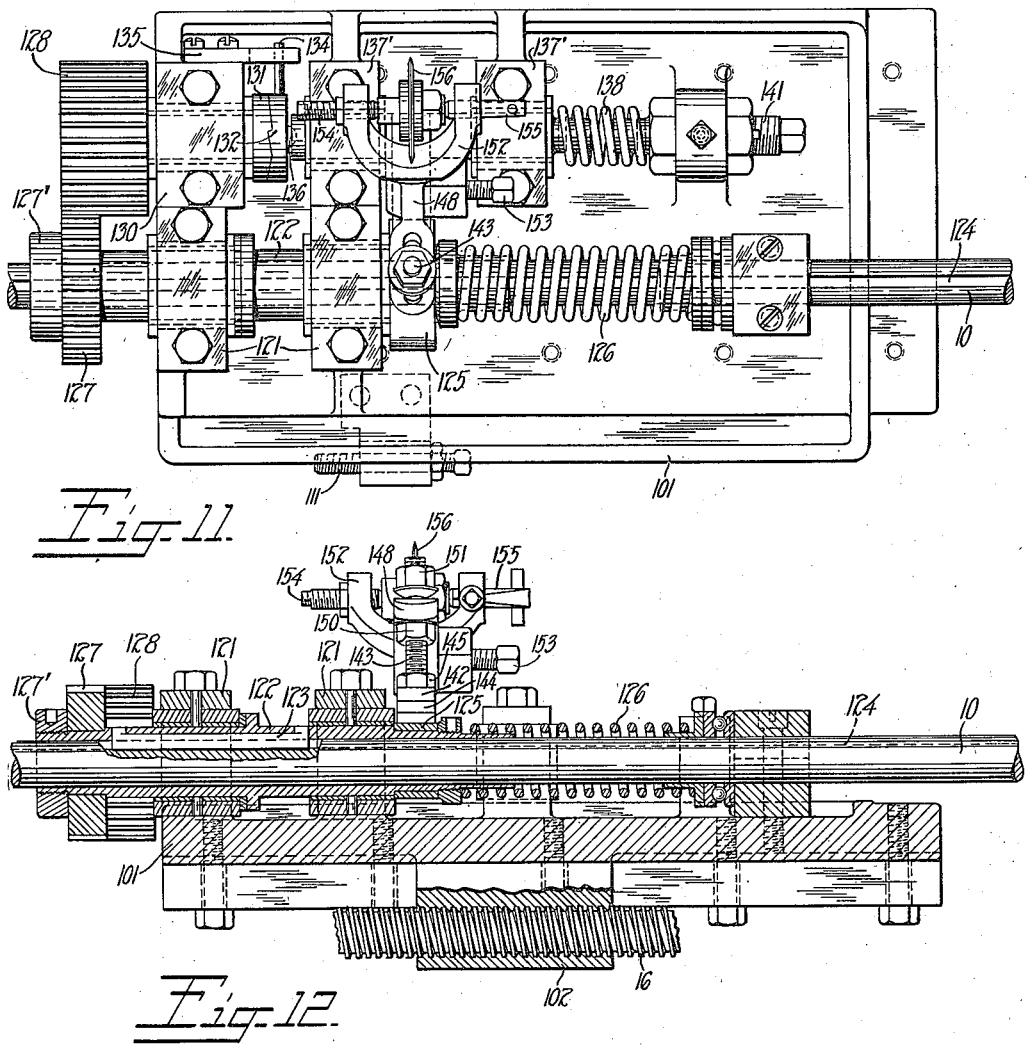

Patented Nov. 1, 1927.

1,647,358

UNITED STATES PATENT OFFICE.

CECIL R. HUBBARD, OF NEWARK, NEW YORK, ASSIGNOR TO THE MECHANICAL RUBBER COMPANY, OF CLEVELAND, OHIO, A CORPORATION OF NEW JERSEY.

MACHINE FOR CUTTING ANNULAR ARTICLES.

Application filed May 14, 1924. Serial No. 713,156.

This invention relates to a machine for cutting annular articles, more particularly to a machine for cutting rubber washers or rings, such as those used for sealing preserve jars.

It has been common in the rubber art to form rubber rings or washers for various purposes by building up a tube of vulcanizable material, and after vulcanization forming rings from the tube by making a series of transverse cuts therethrough. This method has been widely applied in the making of the ordinary preserve jar rings. In the cutting of rings from a vulcanized tube the latter is first cut into suitable lengths which are forced on mandrels, and the operator then inserts a tube-carrying mandrel between the head and tail stocks of the cutting machine, and the tube and mandrel are rotated while so held. In order to cut the tube a reciprocating carriage is disposed in front of the head and tail stocks, on which carriage a cutter is mounted, and as the carriage moves laterally of the machine in one direction in front of the mandrel the cutter is intermittently brought into contact with the tube on the mandrel to cut it into rings. In order to make a circular and not a spiral cut in the rotating tube it is necessary that the cutter be prevented from moving laterally during a cutting operation, and to secure this result the cutter carriage is ordinarily moved intermittently and is held stationary while the cutter is in contact with the tube. In the present invention the carriage is continuously moved and the cutter is so mounted thereon that it can be given a compensating movement in an opposite direction to that of the carriage while the cutter is in contact with a tube. In using the machines of the present types one operator is usually provided for several machines, and in operating the machines he manually places and secures a tube-carrying mandrel between the head and tail stocks of one machine and starts the mandrel rotating and tube cutting mechanisms. After the cutter has completed the cutting of the tube on the mandrel the machine is automatically stopped, and the operator then removes the mandrel and cut rings and reverses the movement of the machine to bring the cutter carriage back to its starting position, where the machine is again stopped and the same operations repeated. Due to the number of manual operations required the operator can attend to only a few machines. Many of the small rubber articles used in the trade, such as rubber jar rings, must be sold at a comparatively low price, and yet, due to the number of operations required in their manufacture their cost is relatively high. Hence, in order to manufacture such articles at a profit the number of operations required, particularly those necessitating manual labor, must be reduced to a minimum.

An object of my invention is to provide a wholly automatic machine of greatly increased capacity for cutting annular articles.

Another object is to provide a jar ring cutting machine having an automatic feed for the mandrels carrying the tubes to be cut.

Still another object is to provide a jar ring cutting machine having an automatic cutter mechanism reverse.

A further object is to provide an improved drive mechanism for jar ring cutting machines.

The invention comprises broadly means for holding and rotating a tube-carrying mandrel, a cutter-carrying mechanism adjacent thereto, means for reciprocating the cutter-carrying mechanism and operating the cutter during movement thereof in one direction, and means for automatically feeding mandrels to the holding and rotating means, exchanging mandrels during the idle movement of the cutter-carrying mechanism and discharging the mandrels with cut tubes.

For a detailed disclosure of the nature and objects of the invention reference is had to the accompanying specification and drawings, in which latter:—

Figure 3 is a detail of the gear shifting mechanism,

Figure 1:
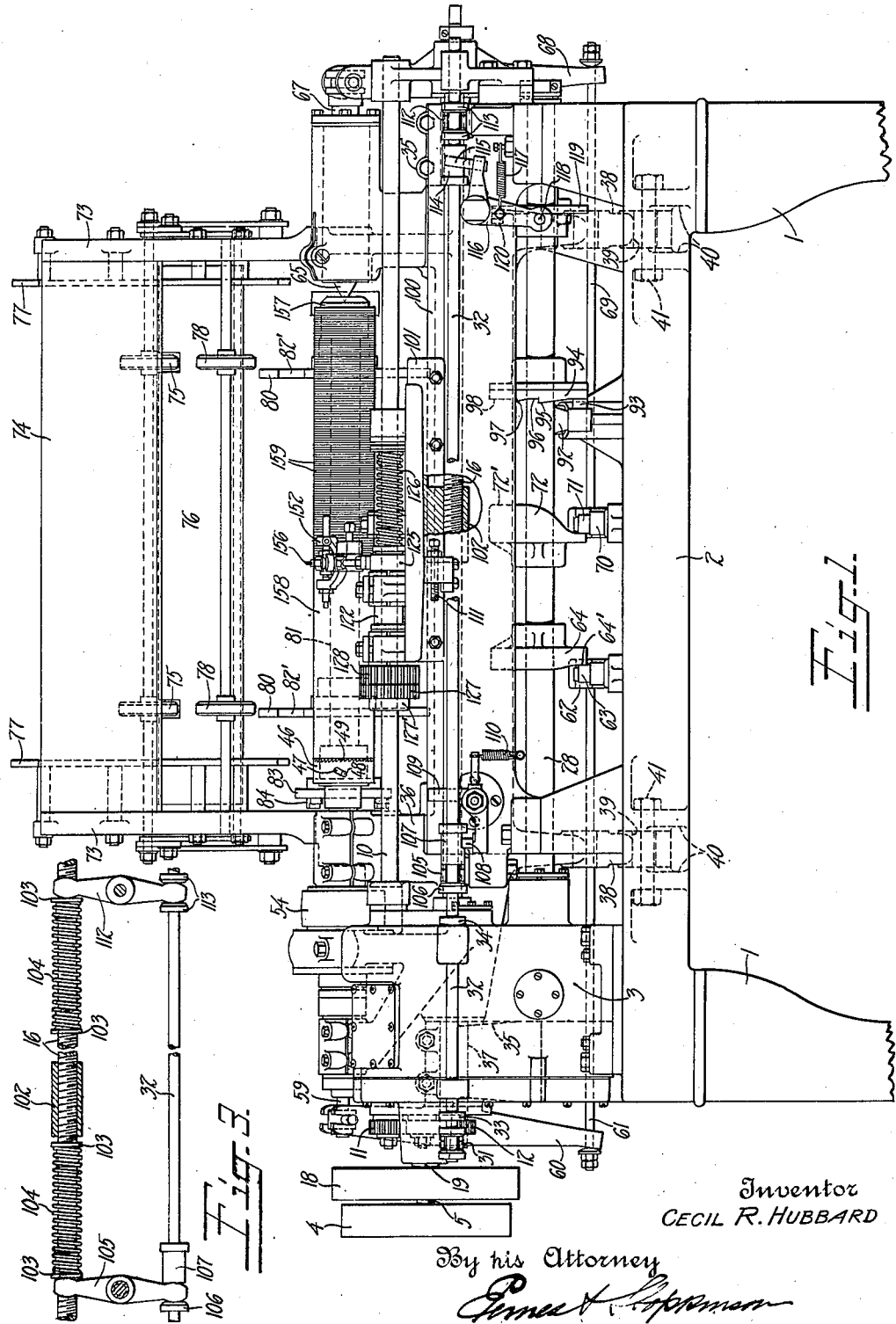
Figure 1 is a front elevation of a machine embodying my invention.

Figure 4 is an enlarged sectional detail of the mandrel holding and rotating mechanism, Figure 5 is a part sectional detail of a stop mechanism for the mandrel carrier, Figure 6 is a transverse section therethrough, Figure 7 is an enlarged sectional detail illustrating the cutting mechanism, Figure 8 is a horizontal section of the drive mechanism and gear shift, Figure 9 is an end elevation, partly broken away, of the same, Figure 10 is a vertical section through the same, Figure 11 is an enlarged plan of the cutter carriage and cutter, Figure 12 is a longitudinal section through the cutter carriage on the line of the cutter cam shaft, and Figure 13 is a similar section on the line of the cutter rock shaft.

Referring to the drawings, the numeral 1 designates the base of the machine, on which is mounted a main frame 2 carrying at one end thereof a gear box 3. In the present embodiment two different trains of driving gears are used at different periods in the operation of the machine as follows: A pulley 4 driven from any suitable source of power is mounted on a shaft 5 journalled in the gear box 3 (Figs. 8 to 10), and slidably keyed to said shaft is a toothed clutch member 6 which is adapted to operatively engage a combined gear and clutch member 7 loose on the shaft 5, the clutch member 6 being moved to and from operative position by the shifter 8. Meshing with the gear and clutch member 7 is a gear 9 secured on a shaft 10 which extends through the machine and actuates a cutter operating cam in a manner to be hereinafter described. A gear 11 is mounted on the end of shaft 10 outside of the gear box 3, which gear meshes with a gear 12 rigid on a short shaft 13 journalled in the gear box, the latter shaft having rigidly mounted thereon a gear 14 meshing with a combined gear and clutch member 15 loose on the screw feed shaft 16 to be later described. Slidably keyed on the shaft 16 is a double faced clutch member 17, one face of which by means of the shifter 8 may be engaged with the gear and clutch member 15 to drive the shaft 16 in one direction. A second drive pulley 18 is mounted on a tubular shaft 19 which is sleeved over the shaft 5, and slidably keyed to the shaft 19 is a clutch member 20 which when actuated by the shifter 8 may be brought into driving relation to a combined gear and clutch member 21 loose on the shaft 19. The gear 21 meshes with a gear 22 rigid on a short shaft 23 journalled in the gear box, which shaft carries a worm 24 meshing with a worm wheel 25, on the shaft of which latter is a mitre gear 26 meshing with a mitre gear 27 carried on one end of a main cam shaft 28 to be later described. The gear 22 also meshes with a combined gear and clutch member 29 loose on the screw feed shaft 16, which when the second face of the double clutch member 17 is brought into operative engagement with the gear and clutch member 29, drives the screw feed shaft 16 in the opposite direction to that imparted to it by the gear train previously described, and at a much higher rate of speed, the gearing in the present instance being so arranged as to drive it four times as fast. The clutch shifter 8 is rigidly connected to a slide rod 30 mounted in the gear box, which slide rod is pivotally connected to one end of a lever 31, the opposite end of which latter is pivotally connected to a shift rod 32 extending along the front of the machine and actuated in a manner to be later described. Mounted on said shift rod are stop collars 33 and 34 for limiting its movement in either direction.

*Mandrel handling mechanism.*

Attached to the rear side of the main frame at each end are brackets 35 in which an auxiliary frame 36 is pivotally mounted by the shaft 37 (Figures 1 and 2), the entire mandrel handling mechanism being carried by this frame. Projecting downwardly from adjacent each end of the auxiliary frame is a bracket arm 38 provided at its lower end with a curved slot 39, this lower end having a close sliding fit in a forked bracket 40, in which it is held in adjusted position by the bolt 41.

*Mandrel holding and rotating mechanism.*

Rotatably mounted in an extension of the frame 36 (Figure 4) is a head stock 42 carrying at one end a chuck 43, which latter is provided with a frusto-conical recess 44 adapted to receive one end of a tube-carrying mandrel, and centrally mounted in the chuck is a spring pressed mandrel ejecting pin 45. A sleeve 46 (Figures 1 and 4) is rotatably and longitudinally movable on the chuck 43, said sleeve being provided with inclined cam slots 47 through which project pins 48 secured in the chuck. The forward end of the sleeve is provided with teeth 49 or other suitable means for engaging one end of a tube which is being cut into rings, in order to prevent longitudinal movement of the tube on its supporting mandrel, in a manner to be hereinafter described. The specific form of chuck just described forms no part of the present invention and is that disclosed in the copending application of Jesse B. McClain, Serial No. 713,961, filed May 17, 1924, now Patent No. 1,595,205, issued Aug. 10, 1926. Loosely mounted on an intermediate portion of the head stock 42 is a sleeve 50 carrying at one end a clutch member 51, and slidable to a limited extent over the first sleeve is a second sleeve 52 which carries at one end a clutch member 53. Disposed between the clutch members 51 and 53 is a drive pulley 54 which is freely rotatable when the clutch members are separated and which is adapted to drive them when they are drawn together in co-operative relation. Disposed between the sleeves 50 and 52 is a coiled compression spring 55 which tends normally by its expansion to move the sleeves in opposite directions and thereby engage the clutch members 51—53 with the drive pulley. The sleeve 52 carries in rear of the clutch member 53 a brake 56 which is adapted to co-operate with the spring-pressed brake shoe 57. Rotary movement imparted to the clutch members 53—51 by the pulley 54 is transmitted to the head stock 42 by means of a key 58 fitted in the clutch member 53 and in slots in the sleeve 50 and head stock, said key also passing through a slot in a pull rod 59 centrally disposed in the rear end of the head stock. Movement of the pull rod 59 to the left in Figure 4 therefore both releases the clutch and applies the brake. The rear end of the pull rod is pivotally connected to one end of a lever 60 pivotally mounted on the end of shaft 37, while the lower end of the lever is connected by a link 61 with one end of a lever 62, at the opposite end of which latter is mounted a cam follower 63 adapted to co-operate with a side face cam 64 mounted on the main cam shaft 28, which cam is provided with a single low spot 64', while the balance of its face forms a dwell.

Co-operating with the head stock is a tail stock which is provided with a conical headed pin 65 adapted to engage the opposite end of a tube-carrying mandrel. This pin is rotatably mounted in a sleeve 66 slidable in an extension of the frame 36, and the tail stock is normally urged into operative or mandrel holding position by the coiled spring 67. The rear end of the sleeve 66 is pivotally connected to a lever 68 pivotally mounted on the opposite end of shaft 37 from lever 60, the lower end of said lever being connected by a link 69 to one end of a lever 70, which latter at its opposite end is provided with a cam follower 71 engaging a side face cam 72 mounted on the main cam shaft, this cam being provided with a single somewhat extended high spot 72'.

*Mandrel feeding mechanism.*

Attached to the auxiliary frame 36 are spaced vertical brackets 73 (Figures 1 and 2) to which is secured an inclined plate or bottom 74 forming part of a mandrel magazine, and spaced from the lower end of the plate 74 are rubber-covered stop rollers 75 which deflect the mandrels moving down the plate 74 into the lower portion of the magazine which is formed by a curved plate 76 also secured between the brackets 73. Disposed at each side of the plates 74—76 are bent side plates 77 for guiding the mandrels in their movement through the magazine, and spaced from the lower end of the plate 76 are a second set of rubber-covered stop rollers 78 which deflect the mandrels into a rotary mandrel carrier 79. The mandrel carrier is formed by a pair of spaced spider plates 80 which are secured on a shaft 81, the latter being rotatably mounted at its ends on cone bearings 82 secured in the brackets 73 (Figure 5). Each spider plate is formed with a series of curved mandrel receiving recesses 82' which in the present instance are five in number. These recesses are of a diameter slightly greater than that of a mandrel and tube, and as will be noted from an inspection of Figure 2 the recesses are not located exactly radially of the carrier but slightly eccentrically, so that each mandrel delivered from the magazine and falling into a pair of recesses tends to overbalance the carrier and cause it to rotate. In order to prevent rotation of the carrier except when desired the following stop mechansim is provided. Mounted on one end of the shaft 81 of the carrier (Figure 5) is a stop disc 83, from the face of which project stop pins 84 corresponding in number to the recesses in each spider plate 80, and each stop pin is cut away to form a flattened face 85, this face being further cut away at the outer end of the pin to form a shoulder 86. A carrier stop 87 is slidably mounted in the bracket 73 and is yieldingly urged toward the stop disc by a coiled spring 88. The projecting portion of the stop which is in the path of the flattened faces of the pins 84 is flattened or cut away at 89, so that as the carrier rotates the flat face 85 on one of the stop pins can engage the flat face 89 on the stop when the latter is projecting out to its full extent as shown in Figure 5, while when the stop is partially withdrawn the carrier and the co-operating stop pin 84 may move slightly further until the stop 87 rests against the shoulder 86 on the pin. Pivotally secured to the rear end of the stop 87 is a lever 90 the lower end of which is connected by the link 91 to one end of a lever 92 (Figures 1 and 2) which latter at its opposite end carries a cam follower 93 co-operating with a side face cam 94 mounted on the main cam shaft 28. It will be noted from Figure 1 that the cam 94 has a high spot 95 which acts to entirely withdraw the stop 87 and thereby allow the carrier 79 to freely rotate, but as soon as the cam follower passes off of this high spot it drops into the recess 96 which allows the stop to move all the way out and halt the movement of the carrier when the next stop pin 84 engages the stop. In the further movement of the cam the follower passes on a high spot 97 of less height than the spot 95, which acts to partially withdraw the stop to a point slightly beyond the shoulder 86 on the stop pin at that time engaging the stop, thereby allowing the carrier to rotate slightly further, and as the follower 93 passes off the high spot 97 and onto the dwell 98 the stop 87 rests on the shoulder 86 until the cam follower again reaches the high spot 95. Secured to the auxiliary frame 36 beneath the carrier 79 is a curved discharge plate 99 down which the mandrels carrying cut tubes may roll and be delivered to a conveyor or any suitable receptacle.

Tube cutting mechanism.

Disposed at the upper end of the main frame 2 is a slide 100 (Figure 2) over which is movable a cutter carriage 101, the carriage being provided with a downwardly projecting nut 102 which threadedly engages the screw feed shaft 16. As before pointed out the drive mechanism is arranged to rotate the screw feed shaft 16 in either direction but at different speeds, and in the present instance mechanism has been provided whereby the carriage itself at either end of its movement may actuate the drive mechanism to reverse the movement of the screw shaft. The screw feed shaft 16 is provided adjacent one end (Figure 3) with oppositely directed flanged sleeves 103 which are freely movable over the threads of the shaft, and disposed on the shaft is a coiled spring 104 the ends of which tightly fit over the sleeves 103 and abut against their flanges. Adjacent the outermost sleeve 103 is the forked end of a lever 105, which end straddles the shaft 16 while the opposite end of the lever is also forked and straddles the shift rod 32 at the front of the machine, this latter end being held between a collar 106 and a latch 107, both of which are rigidly secured to the shift rod. The latch is provided on its lower side (Figure 1) with a recess which is adapted to be engaged by the latch pin 108 secured on the angled lever 109, which lever is normally held in latching position by the spring 110. Adjustably mounted on the cutter carriage is a screw 111 which at the proper time in the movement of the carriage is adapted to engage the lever 109 and release the latch 107. At the opposite end of the screw feed shaft 16 is a second pair of spaced flanged sleeves 103 similar in all respects to those previously described and carrying between them a spring 104. The outermost of these sleeves is adapted to engage the forked end of a lever 112, the opposite end of which lever straddles the shift rod 32 and is held between fixed collars 113. Also secured on the shift rod 32 adjacent the collars 113 is a latch 114 provided on its lower surface with a recess which is adapted to be engaged by the fork 115 carried on one arm of an angled lever 116, and the lever is normally held in latching position by the spring 117. Mounted on the lower end of the lever 116 is a cam follower 118 co-acting with a side face cam 119 mounted on the main cam shaft 28, this cam having a single sharp incline 120 on its face adapted to momentarily actuate the lever 116 and thereby release the latch 114.

Rotatably and slidably mounted in bearings 121 on the cutter carriage is a sleeve 122 (Figures 11 and 12), which sleeve surrounds the cutter cam shaft 10 and is keyed thereto by the key 123 moving in the keyway 124 on the shaft. Rigidly secured on the sleeve 122 is a cutter actuating cam 125, the shape of which is most clearly disclosed in Figures 2 and 7 and which is adapted to actuate the cutter twice for every revolution of the cam shaft. The sleeve 122 is normally yieldingly pressed to the left, as shown in Figure 12, by the coiled spring 126 surrounding the shaft 10 and bearing against the sleeve. As before stated the machine of the present invention is of the type in which the cutter carriage is continuously driven during a ring cutting operation, and the following mechanism is therefore provided for imparting to the cutter a compensating movement in the opposite direction while cutting a ring. A gear 127 is rigidly secured on the sleeve 122 by a lock nut 127' and this gear engages a broad-faced gear 128 carried on a short part-tubular shaft 129 mounted in the bearing 130, this shaft carrying at its opposite end a side face cam 131. Co-operating with this cam is a second cam 132 mounted on a stub shaft 133 slidable within the shaft 129, and rotation of the cam 132 is prevented by a pin 134 projecting therefrom and slidable in a slotted bar 135 (Figure 11) mounted on the bearing 130. Secured on the outer face of the cam 132 is a thrust bearing 136 co-acting with a bearing recess carried in the end of the cutter rock shaft 137, which latter is mounted for rocking and sliding movement in the bearings 137'. In order to yieldingly resist both of these movements of the rock shaft 137 a coiled spring 138 is provided, one end of which is disposed in a slot 139 in the end of the rock shaft, and the other end of which enters a slot 140 in a threaded adjusting screw 141. Rigidly carried by the rock shaft 137 and in the present instance integral therewith is a rock arm 142 (Figure 7), in the outer end of which is disposed a bolt or pin 143, the head 144 of which is of convex form and forms a follower for the cutter actuating cam 125, this head being held in rigid relation to the arm 142 by the lock nut 145. Adjustably secured in the lower side of the arm 142 is a stop screw 146 which is adapted to co-act with the fixed stop 147 on the carriage to limit the downward movement of the rock arm. A cutter-carrying arm 148 is pivotally mounted at 148' in the rock arm 142, and is provided at its outer end with a slot 149 through which projects the bolt 143, and it will be seen that by adjustment of the lock nuts 150 and 151 threaded on the bolt on opposite sides of the arm 148 its angular position with respect to the rock arm 142 may be varied. A cutter-carrying yoke 152 is longitudinally adjustable in the arm 148 and held in adjusted position by means of the set screw 153, and adjustable in the arms of the yoke are the cone bearings 154 and 155 supporting between them the hub of the rotary disc cutter 156.

Operation.

Figure 2:
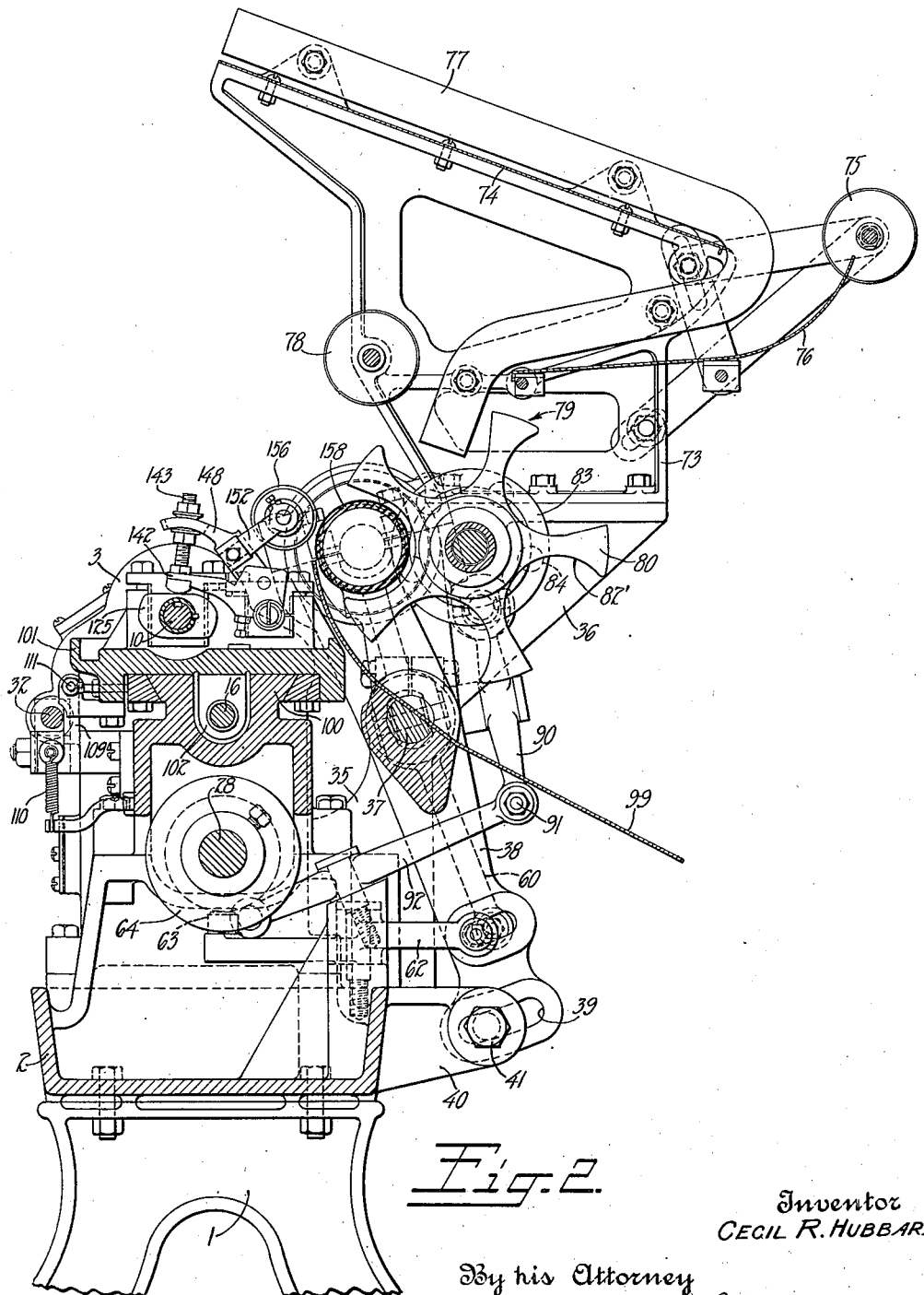
Figure 2 is a transverse section looking toward the left in Figure 1.

In operation the magazine at the top of the machine is filled with mandrels carrying tubes to be cut, and when the magazine has been filled there will be a row of mandrels extending down the plates 74 and 76 with one mandrel disposed in the upper pair of recesses 82' of the carrier, and it will be assumed for convenience that another mandrel 157 carrying an uncut tube 158 is held by the head and tail stocks in the front pair of recesses opposite the cutting mechanism, which latter at the start is at the extreme right of the machine. In this position of the cutting mechanism the drive is through the pulley 4, and the clutch mechanism is in the position shown in Figures 8 and 10, so that as the shaft 5 of pulley 4 rotates it drives the loose gear and clutch member 7 through the clutch 6 and the gear in turn drives gears 9, 11, 12, 14, and the gear and clutch member 15, and the latter through the double-faced clutch 17 drives the screw feed shaft 16 in a clock-wise direction as viewed from the left of Figure 8, thus moving the cutter carriage to the left. In addition the gear 9 in the train of gears just mentioned drives the cutter cam shaft 10, and for every revolution of the latter the cam 125 twice actuates the cutter mechanism to press it against the tube 158 on the mandrel. At the same time the gear 127 carried by the sleeve 122 on the cutter cam shaft drives the compensating mechanism through gear 128 so that twice during each revolution of the cam shaft 10 the cams 131 and 132 move the cutter per se in a direction opposite to that in which the carriage is moving so that the cutter 156 can make circular cuts in the tube to form the rings 159. This operation continues until the carriage approaches the left-hand side of the machine, at which time the nut 127' on gear 127 engages the frame of the machine and gradually pushes the sleeve 122 and cutter cam 125 to the right in opposition to the spring 126. In the meantime the nut 102 underneath the carriage 101 has engaged the sleeve 103 and gradually compresses the spring 104. Just as the cutter has finished cutting the tube the cutter cam 125 has been moved to the right sufficiently to pass out from under the cam follower 144 and due to the spring 138 the cutter then automatically drops back to inoperative position. About this time the screw 111 on the carriage engages the lever 109 to release the latch pin 108 from the latch 107, and due to the pressure exerted by the spring 104 on the lever 105 the latter actuates the shift rod 32 as soon as the latch is released. The shift rod in turn actuates the lever 31 to shift the clutch mechanism of the gear box 3 to the left, as viewed in Figure 8, through the shifter 8. The drive now is from the belt pulley 18, which latter through its shaft 19 actuates the clutch member 20, and the latter in turn drives the gear and clutch member 21, gear 22, worm 24, worm wheel 25, miter gears 26 and 27, and main cam shaft 28. At the same time the gear 22 of the train drives the gear and clutch member 29 and the latter through the double-faced clutch member 17 drives the screw feed shaft 16 in the reverse direction so as to feed the cutter carriage to the right, and as before stated this train of gears is so proportioned that the idle movement of the cutter carriage to the right is much faster, in the present instance four time more rapid. As the main cam shaft 28 starts to revolve the cam follower 63 moves out of the low spot 64' on the cam 64 and on to the dwell, thereby actuating the lever 60 to withdraw the pull rod 59 of the head stock, which movement releases the clutch members 51 and 53 to free the drive pulley 54 and at the same time bring the brake 56 into contact with the brake shoe 57 to stop the rotation of the mandrel. The cam shaft 28 next causes the cam 72 to actuate the tail stock by withdrawing the conical pin 65, thereby allowing the mandrel ejecting pin 45 in the head stock to operate and release the mandrel with the cut rings thereon. This mandrel, which has been held exactly centered in the recesses in the carrier 79 as shown in Figure 2, then drops a slight distance to the lower wall of the recesses. The cam 94 on the cam shaft next operates to entirely withdraw the carrier stop 87 from the stop pin 84 as the cam follower 93 reaches the high point 95 on the cam, and due to the unbalanced weight of the mandrels in the carrier 79 the latter then starts to rotate, bringing an empty pair of recesses beneath the magazine and thereby allowing a tube and mandrel to fall into the carrier from the magazine while at the same time the previously received mandrel is brought opposite the cutting mechanism and the one which has just been operated upon is brought down to its lowest position in the carrier. Before any further rotary movement of the carrier can take place the cam follower 93 drops into the low spot 96 on the cam, thereby allowing the stop 87 to project again in position to engage the stop pin 84 next succeeding the one just released. About this time the follower of the tail stock actuating cam has moved off the high spot 72' and allows the tail stock pin 65 under the pressure of the spring 67 to engage the mandrel just brought opposite the head and tail stocks, and in this movement of the pin 65 it pushes the opposite end of the mandrel into the head stock and centers the mandrel, thereby lifting it slightly from the sides of the recesses 82'. By this time the cam 94 has moved sufficiently for the follower 93 to ride up on the second high spot 97, which latter withdraws the stop 87 sufficiently to bring it above the shoulder 86 on the stop pin 84, this movement permitting a further slight rotation of the carrier 79 so that it will be about in the spaced position shown in Figure 2 with respect to the mandrel and tube, thereby insuring that during the cutting operation the rotating mandrel and tube will be entirely free from the carrier. After the cam follower passes the high point 97 and onto the dwell 98 the carrier stop 87 rests on shoulder 86 until again completely withdrawn. The cam 64 is next moved sufficiently to release the brake in the head stock and allow the driving pulley 54 to be again clutched to the latter, thereby starting the newly inserted mandrel to rotate. By this time the carriage 101 has moved almost to the right of the machine and the carriage nut 102 has compressed the right-hand spring 104, so that when the cam 119 operates the trip lever 116 to release the fork 115 from latch 114 the spring 104 actuates lever 112 to move the shift rod 32 in the reverse direction, thereby actuating the clutch mechanism of the gear box to release the driving pulley 18 from the machine and again connect the driving pulley 4. As soon as the driving pulley 4 comes into operation the carriage again moves to the left and the cutter cam shaft 10 starts to rotate. When the rotation of the shaft has brought one of the flat sides of the cutter cam 125 tangential to the face of the cam follower 144 the cam slips back under the follower, due to the pressure of spring 126, and the cutting mechanism automatically again becomes operative.

The tubes 158 to be cut are ordinarily held on the mandrels merely by friction. At the start of a cutting operation, as the cutter 156 is of material thickness, it exerts a slight wedging action as it enters the material and due to the friction between the mandrel and the bulk of the tube on the left-hand side thereof the tube remains fixed on its mandrel, but the cut ring is forced slightly to the right, and as the operation proceeds succeeding rings are forced slightly to the right. However, as the cutter approaches the left-hand side of the tube 158 the friction of the cut rings 159 on the mandrel has increased sufficiently to overcome the friction of the uncut portion of the tube, with the result that this uncut portion tends to move to the left as the cutter enters and completes a cut, thereby causing unevenness in the rings. The sleeve 46 on the chuck is provided to prevent this slipping action of the small uncut remainder of the tube, and at the start of a newly positioned mandrel and tube into rapid rotation the sleeve 46 due to its inertia tends to remain stationary and later to drag behind the chuck in the rotary movement of the latter. Hence the pins 48 on the chuck moving downwardly in the inclined slots 47 force the sleeve 46 to the right in position for its teeth 49 to engage the left-hand end of the uncut tube 158 and prevent any lateral movement of the latter. It will be seen that during a cutting operation the carrier always contains three tube-carrying mandrels, one at the top ready to move to cutting position, one at the front on which the cutter is operating, and one at the bottom which is ready to be released on the next movement of the carrier. As these three tube-carrying mandrels are all located partially or wholly in front of the shaft of the carrier the latter always tends to rotate as soon as it is freed from the stop mechanism.

The machine as above described comprises two main units, one, the cutting mechanism supported on the slide 100, and two, the mandrel handling mechanism which is pivotally supported on the shaft 37. Hence by releasing the bolts 41 the arms 38 can be moved so as to tilt the mandrel handling mechanism toward or away from the cutting mechanism, and in this way compensate for mandrels of different diameter and also for tubes thereon of different thickness, although, of course, the cutter mechanism can also be adjusted to vary the depth of cut either by longitudinal adjustment of the cutter yoke 152 or angular adjustment of the cutter supporting arm 148, or both, and it can also be varied by using a different cam 125. It will be seen, however, that by adjusting the entire mandrel handling mechanism as a unit, the relation between the magazine, the carrier, the discharge chute, and the stop mechanism for the carrier will always remain the same.

It will be seen that by my invention an entirely automatic, rapid and efficient jar ring cutting machine has been provided. Instead of the old wholly manual handling of the mandrels in feeding, securing, and removing them the entire feed mechanism operates automatically. Moreover the reverse of the cutter carriage after the finish of a cutting stroke is also automatic. Hence as the entire attention of the operator can be devoted to merely supplying mandrels carrying uncut tubes to the magazines of the various machines a single operator is enabled to take care of a large number of machines. By the provision of the separately driven trains of gears an efficient, relatively simple mechanism is provided for driving the cutter carriage at an increased rate of speed on its return or idle stroke.

It is obvious that the machine is adapted for cutting other articles than rubber jar rings, and while a specific embodiment of the invention has been shown and described, the present detailed disclosure will suggest numerous modifications to those skilled in the art and it is not desired to limit the invention otherwise than as set forth in the attached claims.

Having thus described my invention what I claim and desire to protect by Letters Patent is:—

1. A machine for cutting annular articles from tubes comprising automatic means for cutting a tube into rings, automatic means for successively feeding tubes thereto and discharging the cut articles, and means for freeing the tube feeding means from the tube during the cutting operation.

2. A machine for cutting annular articles from tubes comprising automatic means for cutting a tube into rings, and automatic cutting a tube into rings, and automatic means governed thereby for successively feeding tubes thereto and discharging the cut articles in assembled relation.

3. A machine for cutting annular articles comprising automatic means for positioning a blank, means movable longitudinally of the blank for successively cutting a series of annular articles therefrom, and means for discharging the cut articles from the machine.

4. A machine for cutting annular articles comprising automatic means for successively positioning tubular blank carrying mandrels, means for cutting a series of annular articles from each blank, and means for discharging each mandrel and its series of cut articles from the machine.

5. A machine for cutting annular articles comprising means for holding a tube-carrying mandrel, means for successively cutting rings from the tube, and automatic means governed by the cutting means for positioning the tube-carrying mandrel in the holding means.

6. A machine for cutting annular articles comprising means for holding a tube-carrying mandrel, means for successively cutting rings from the tube, and automatic means for positioning the tube-carrying mandrel in the holding means and for withdrawing the same and discharging it from the machine after the cutting operation.

7. A machine for cutting annular articles comprising means for holding and rotating a tube-carrying mandrel, means for successively cutting rings from the tube, a mandrel and tube magazine, and automatic means for supplying tube-carrying mandrels from the magazine to the holding means.

8. A machine for cutting annular articles comprising means for feeding mandrels carrying tubular blanks, a carrier for receiving said mandrels and tubes and rotatable thereby, means for intermittently locking the carrier against rotation, and means for cutting a blank into annular articles while the carrier is locked.

9. A machine for cutting annular articles comprising a step by step rotatable carrier having spaced peripheral recesses for blank carrying mandrels, mandrel feed and discharge means dispersed on opposite sides of the carrier and co-operating with spaced recesses, mandrel positioning and rotating means disposed between said feed and discharge means, and blank cutting means co-operating therewith.

10. A machine for cutting annular articles comprising a carrier movable step by step, means for supplying tubular blanks thereto at one point in its path, means disposed at another point in its path and movable longitudinally of the carrier for cutting each blank into annular articles, means for simultaneously imparting a reverse movement to the cutting means during a cutting operation, and means whereby the cut articles may be discharged from the carrier at another point in its path.

11. A machine for cutting annular articles comprising a rotary gravity operated carrier, means for intermittently holding it in fixed position, means for supplying tubular blanks to the carrier at one point in its rotation, means disposed adjacent the carrier at another point and movable longitudinally of the carrier for successively cutting the blanks into a series of annular articles, and means adjacent the carrier at another point in its rotation for conducting away the cut articles.

12. A machine for cutting annular articles from tubes comprising a peripherally recessed intermittently movable rotary carrier, means for successively supplying tubes to the recesses of said carrier at a fixed point in its rotation and discharging them at another, means for holding, rotating and cutting each tube at an intermediate point, and means whereby the carrier may be freely spaced from the tube during a cutting operation.

13. A machine for cutting annular articles comprising a rotary carrier having peripheral recesses for the reception of blank carrying mandrels, means for intermittently locking the carrier against rotation, head and tail stocks for automatically engaging a mandrel while the carrier is locked, and means for cutting the blank on said mandrel into annular articles.

14. A machine for cutting annular articles from the tubes comprising means for holding a tube-carrying mandrel, tube cutting means co-acting therewith and having an operative and an idle reciprocative movement, means for intermittently presenting the cutting means to the tube during an operative movement, and means for automatically withdrawing said mandrel and replacing it by another during said idle stroke.

15. A machine for cutting annular articles from tubes comprising means for holding a tube-carrying mandrel, tube cutting means co-acting therewith and having an operative and an idle reciprocative movement, and means governed by said cutting means for withdrawing said mandrel and replacing it by another during said idle movement.

16. A machine for cutting annular articles from tubes comprising feeding, holding and rotating means for tube-carrying mandrels, a reciprocable cutter carriage having a cutter adapted to cut the tubes on successive mandrels into rings, means for intermittently moving the cutter oppositely to its carriage, and automatic means for actuating all said parts in proper sequence.

17. A machine for cutting annular articles from tubes comprising means for holding and rotating a tube, a cutter carriage movable longitudinally of the tube, means for intermittently presenting the cutter to the tube during the longitudinal movement of the carriage, positive means for imparting a compensating bodily movement to the cutter opposite to that of the carriage during a cutting movement, whereby a ring cut is made instead of a spiral one, and means for resisting said bodily movement.

18. A machine for cutting annular articles from tubes comprising means for holding and rotating a tube, a cutter carriage movable longitudinally of the tube, cutting mechanism movably mounted on the carriage, means for intermittently operatively disposing the cutter mechanism with respect to the tube, cam means for imparting to the cutting mechanism a compensating movement exactly opposite to the longitudinal movement of the carriage, and yielding means for resisting said compensating movement.

19. In a machine for cutting annular articles, means for rotating a tubular blank, a cutter carriage continuously movable longitudinally of the blank, a cutter carried thereby and means for intermittently presenting it in cutting relation to the blank, and cam mechanism for imparting to the cutter a compensating movement equal to but opposite that of the carriage during a cutting operation.

20. A machine for cutting annular articles from tubes comprising means for holding and rotating a tube-carrying mandrel, a cutter carriage having an operative and an idle reciprocative movement, a tube cutter carried thereby and intermittently actuated during said operative movement, and means actuated by said carriage for reversing its direction at the end of each movement, said means including means for withdrawing the mandrel and replacing it by another during said idle movement.

21. A machine for cutting annular articles from tubes comprising automatic means for cutting a tube into rings, a magazine, a gravity actuated carrier for transferring tubes from said magazine to the cutting means, and governing means for said carrier actuated by said cutting means.

22. A machine for cutting annular articles from tubes comprising automatic means for cutting a tube into rings, a magazine, a gravity actuated carrier for transferring tubes from said magazine to the cutting means, stop mechanism for first checking said carrier with a tube in co-operative relation to the cutting means and then permitting a slight further movement of the carrier, and means governed by the cutting means for actuating said stop mechanism.

23. A machine for cutting annular articles comprising means for holding a tubular blank, a cutter for cutting said blank into rings, a travelling carriage for said cutter, separate automatic drive means for moving said carriage in opposite directions at different speeds, and automatic means for alternately operatively connecting it to one or the other of said drive means.

24. A machine for cutting annular articles comprising means for holding a tubular blank, a cutter carriage having an operative movement and an idle return movement, a cutter carried thereby in intermittent cutting relation to said blank during an operative movement, a screw feed rod for said carriage, separate drive means, different gear trains between said drive means and said screw feed rod, and means actuated by the carriage adjacent each end of its travel for alternately rendering each gear train operative.

25. A machine for cutting annular articles from tubes comprising means for holding and rotating a tube, means for cutting the same, automatic means for intermittently withdrawing a cut tube and disposing an uncut one in approximately centered relation to said holding and rotating means, and means whereby said automatic means may move slightly after reception of a tube by said holding means.

26. A machine for cutting annular articles comprising automatic means for feeding tubular blanks, positioning them for cutting and discharging the cut articles, cutting means co-operating therewith, and means whereby said previously named means may be relatively moved to vary the depth of cut.

27. A machine for cutting annular articles comprising automatic means for feeding tubular blanks, positioning them for cutting and discharging the cut articles, cutting means co-operating therewith, and means whereby the entire first named means may be bodily moved to vary the depth of cut.

28. A machine for cutting annular articles comprising automatic means for feeding tubular blanks, positioning them for cutting and discharging the cut articles, means for pivotally mounting said means for adjustment, means for holding said first means in adjusted position, and cutting means co-operating with said first means.

29. A machine for cutting annular articles from tubes comprising feeding means for tube-carrying mandrels, mandrel holding and rotating means, a cutter carriage reciprocable longitudinally of the mandrel holding means, a cutter carried thereby and adapted to cut a tube into rings, a train of gears adapted to drive said carriage in one direction and simultaneously actuate said cutter, a train of gears for driving said carriage in an opposite direction and simultaneously releasing a cut tube and mandrel and replacing them by an uncut tube and mandrel, clutch mechanism for rendering either train operative, and means for actuating said clutch mechanism governed by said carriage.

30. A machine for cutting jar rings comprising means for holding and rotating a tube-carrying mandrel, a cutter carriage reciprocable longitudinally thereof, a tube cutter carried thereby and operable during movement of the carriage in one direction only, and means controlled by the carriage for driving the carriage at a slower rate in this direction than in the other.

31. A machine for cutting jar rings comprising feeding, holding and rotating means for tube-carrying mandrels, a cutter carriage reciprocable in co-operative relation to said holding and rotating means, a tube cutter carried thereby, means controlled by the carriage for driving it in one direction and simultaneously operating the cutter, and means also controlled by the carriage for driving it in the opposite direction and simultaneously therewith operating and regulating the feeding, holding and rotating means.

32. A machine for cutting jar rings comprising feeding, holding and rotating means for tube-carrying mandrels, a cutter carriage reciprocable in co-operative relation to said holding and rotating means, a tube cutter carried thereby and operable during movement of the carriage in one direction only, a cam shaft, cams thereon for controlling said feeding, holding and rotating means, and means for rotating said shaft during movement of the carriage in the opposite direction.

33. A machine for cutting jar rings comprising means for holding and rotating a tube-carrying mandrel, a cutter carriage reciprocable longitudinally of said mandrel, a tube cutter carried thereby, means for automatically reversing the movement of the carriage in either direction, and automatic means for rendering the cutter operative when the carriage is moving in one direction and inoperative when moving in the opposite direction.

34. A machine for cutting jar rings comprising a head stock, means for rotating the same, a rotary tail stock co-operating with the head stock to engage a tube-carrying mandrel, cutter mechanism movable longitudinally of the mandrel and intermittently operable to cut the tube into rings, and automatic means for stopping rotation of the head stock and releasing the mandrel upon completion of the tube cutting operation.

35. A machine for cutting jar rings comprising a head stock, means for rotating the same, a rotary tail stock co-operating with the head stock to engage a tube-carrying mandrel, cutter mechanism movable longitudinally of the mandrel and intermittently operable to cut the tube into rings, and means operable by the cutter mechanism at a predetermined point for stopping the rotation of the head stock and withdrawing the tail stock to thereby release the mandrel.

Signed at Newark, county of Wayne, State of New York, this 23rd day of April, 1924.

CECIL R. HUBBARD.